US012285725B2

(12) United States Patent
Turek et al.

(10) Patent No.: US 12,285,725 B2
(45) Date of Patent: Apr. 29, 2025

(54) SPACER WITH MIXING ELEMENTS, PARTICULARLY FOR MEMBRANE MODULES

(71) Applicants: POLITECHNIKA ŚLĄSKA, Gliwice (PL); POLYMEMTECH SP. Z O.O., Warsaw (PL)

(72) Inventors: Marian Turek, Gliwice (PL); Ewa Bernacka, Czechowice-Dziedzice (PL); Krzysztof Mitko, Skryzszow (PL); Maciej Kijański, Radlin (PL); Marzena Chorążewska, Knurow (PL); Barbara Miller-Turek, Gliwice (PL)

(73) Assignees: POLITECHNIKA SLASKA, Gliwice (PL); POLYMEMTECH SP. Z O.O., Warsaw (PL)

(*) Notice: Subject to any disclaimer, the term of this patent is extended or adjusted under 35 U.S.C. 154(b) by 727 days.

(21) Appl. No.: 17/288,023

(22) PCT Filed: Oct. 21, 2019

(86) PCT No.: PCT/PL2019/000096
§ 371 (c)(1),
(2) Date: Apr. 23, 2021

(87) PCT Pub. No.: WO2020/085925
PCT Pub. Date: Apr. 30, 2020

(65) Prior Publication Data
US 2021/0394120 A1  Dec. 23, 2021

(30) Foreign Application Priority Data

Oct. 23, 2018 (PL) .................................. P.427504
Oct. 23, 2018 (PL) .................................. P.427507

(51) Int. Cl.
*B01D 61/42* (2006.01)
*B01D 63/08* (2006.01)
(Continued)

(52) U.S. Cl.
CPC ........... *B01D 61/422* (2013.01); *B01D 63/08* (2013.01); *B01D 63/10* (2013.01); *B01D 2313/14* (2013.01)

(58) Field of Classification Search
CPC .. D04B 21/10; D04B 21/06; D10B 2403/021; D06M 13/00; D06M 15/00; B01D 63/08;
(Continued)

(56) References Cited

U.S. PATENT DOCUMENTS 6,632,357 B1  10/2003  Barger
6,989,097 B2   1/2006  Karode
(Continued)

FOREIGN PATENT DOCUMENTS

EP      1992400 A1    11/2008
JP     10158962 A  *  6/1998
WO   2004112945 A1    12/2004

OTHER PUBLICATIONS

Pibo Ma et al; "Design and fabrication of auxetic warp-knitted structures with a rotational hexagonal loop"; Textile Research Journal; Jul. 22, 2016, Great Britain.
(Continued)

*Primary Examiner* — Jeremy R Pierce
(74) *Attorney, Agent, or Firm* — Dickinson Wright PLLC; Andrew D. Dorisio

(57) ABSTRACT

The invention relates to a spacer with mixing elements, particularly for membrane modules. The spacer comprises a three-dimensional net with mesh (1) having the shape of polygons with number of sides n≥5, with at least one pair of
(Continued)

sides made of support beams (2) which are not in contact with one another, parallel to one another, preferably inclined from the axis defining the direction of the flow, each of which fits in the volume of a cylinder and is in contact with the surface of membranes (4), with at least one pair of vertices of the sides made of support beams (2) is connected with one another by means of two connectors (3) comprising mixing elements which are not in contact with the surface of both membranes (4) and forming between them an angle $\beta<180°$, each of the connectors (3) fits in the volume of a solid formed by twisting a cylinder along its longitudinal axis by 90°, the spacer having, at least on part of its surface, mixing elements fixed in the net mesh, each of which is made of two beams (101) of the height of 0.1-10 mm, preferably 0.3 mm, being support points of the membrane (103), which are in contact with the membrane (103) and comprise side edges of a polyhedron being a mesh of the net and are connected by at least two connectors (102a) and (102b), intersecting at an angle ($\gamma$) in the range of 0-180°, preferably 30°, or interweaving in at least one point of a flat projection on a plain defined by axes of the beams (101). The spacer makes it possible to minimize fluid flow resistance and operate with a high linear flow velocity in constant conditions.

16 Claims, 10 Drawing Sheets

(51) Int. Cl.
*B01D 63/10* (2006.01)
*D04B 21/06* (2006.01)

(58) Field of Classification Search
CPC ... B01D 63/10; B01D 2313/14; B01D 61/422
See application file for complete search history.

(56) References Cited

U.S. PATENT DOCUMENTS

| | | |
|---|---|---|
| 2002/0162784 A1 | 11/2002 | Kohlheb |
| 2013/0146532 A1 | 6/2013 | Dontula |
| 2016/0151745 A1 | 6/2016 | Karabelas |
| 2018/0071688 A1 | 3/2018 | Kidwell |
| 2018/0117533 A1* | 5/2018 | Arafat ................ B01D 63/06 |

OTHER PUBLICATIONS

Pibo Ma et al; "Review on the knitted structures with auxetic effect"; The Journal of the Textile Institute, Jul. 1, 2016; Great Britain.

Zhengyue Wang et al; "Tensile and forming properties of auxetic warp-knitted spacer fabrics" Textile Research Journal; Jul. 27, 2016, Great Britain.

Yuping Chang et al.; "Fabrication and property of auxetic warp-knitted spacer structures with mesh", Textile Research Journal; Jul. 3, 2017, Great Britain.

Lin Zhou et al.; "Auxetic composites made of 3D textile structure and polyurethane foam"; Physica Status Solidi; Mar. 29, 2016; Germany.

Zhengyue Wang et al; "Deformation behaviors of three-dimensional auxetic spacer fabrics"; Textile Research Journal; Feb. 21, 2014; Great Britain.

Gurreri, et al.; :Flow and mass transfer in spacer-filled channels for reverse electrodialysis: a CFD parametrical study; Journal of Membrane Science; 2016.

Schwinge, et al; "Novel spacer design improves observed flux"; Journal of Membrane Science; 2004.

* cited by examiner

SPACER WITH MIXING ELEMENTS, PARTICULARLY FOR MEMBRANE MODULES

FIELD OF THE INVENTION

The present invention relates to a spacer with mixing elements, particularly for membrane modules, used especially in pressure membrane techniques, dialysis, diffusion dialysis, Donnan dialysis, and also in electrodialysis, reversible electrodialysis, pervaporation and gas separation.

BACKGROUND OF THE INVENTION

A spacer is understood as a permeable layer of material which defines the position of a membrane in the separation process, the design of the spacer should promote mass transfer and show low flow resistance.

Spacers comprise a permeable three-dimensional openwork net with mesh in the shape of a solid which is in contact with the upper and the lower membrane, with walls of a specific design which comprises beams in contact with the membrane and connectors in contact with the beams. The design of the three-dimensional openwork net provides a correct inter-membrane distance; it should promote mass transfer and show low flow resistance.

In membrane modules used in pressure membrane processes such as microfiltration (MF), ultrafiltration (UF), nanofiltration (NF), reversed osmosis (RO), in electromembrane processes such as electrodialysis (ED), electrodialysis reversal (EDR), reversed electrodialysis (RED), Donnan dialysis (DO), diffusion dialysis (Dd), dialysis, as well as in membrane distillation (MD), pervaporation (PV), gas separation (GS) and other, spacers are used to provide the correct distance between membranes or between a membrane and other structural part of a module. Modules equipped with flat membranes are most often spirally-wound or are made as plate and frame modules.

Spirally-wound modules characterized by a high degree of compaction and a relatively low price are most often used in pressure membrane processes, especially (RO), (NF) and (PV) and (GS). In these modules membrane sheets together with a spacer are spirally wound around a central perforated collection tube. Known spacers usually take the form of a three-dimensional net made of plastic, usually by extrusion and their thickness usually ranges from 0.4 to 2 mm. It is assumed that the role of a spacer in membrane modules, apart from creating the inter-membrane space, is to create turbulence close to the membrane surface that minimizes negative consequences of concentration polarization.

Based on shape, diamond-type spacers in which the mesh is rhomb-shaped and ladder-type spacers with mesh in the shape of a rectangle can be distinguished.

Known from an American patent description U.S. Pat. No. 6,989,097 B2 are spacers for membrane modules having strands with cross-section other than circular.

Known from an American patent application US 2002/0162784 A1 are spacers in a form of profiled sheet with U- or V-shaped crests and troughs in cross-section.

American patent application US 2013/0146532 A1 discloses a design of an openwork sheet spacer formed from plastic by an extrusion process, and having wavy or zigzag-shaped grooves.

Also known from an American patent application U.S. Pat. No. 6,632,357 B1 is a design of a membrane for reversed osmosis combining the function of a spacer, with projections in form of nodes on both its surfaces defining distance between membranes.

Known from international patent application WO2004112945A1 is a spacer for use in a membrane separation device, wherein the same is at least partly formed by an assembly of bands, which bands are subdivided in a first series of bands disposed substantially parallel to one another in a first plane and a second series of bands substantially disposed parallel to one another in a second plane, wherein the first and the second plane are oriented parallel to one another and wherein the longitudinal direction of the bands in the first series runs at an angle to the longitudinal direction of the bands in the second series, and wherein the bands are twisted along the longitudinal axis.

Furthermore, there is a series of scientific publications in which the influence of spacer geometry on the permeate/product stream and pressure drop is analyzed based on laboratory research and Computational Fluid Dynamics, CFD). The publication of J. Schwinge et al. (Journal of Membrane Science 229 (2004) 53-61), where two- and three-layer spacers were compared can be used as an example.

The mixing element is an element of the design of a fragment of the mesh of the spacer which disrupts fluid flow and causes its mixing. A typical mixing element comprises a beam in contact with the membrane which narrows the cross section of the flow causing turbulence which enhances dispersion.

Known from literature (L. Gurreri et al./Journal of Membrane Science 468 (2014) 133-148), is a solution, wherein the spacer comprises a three-dimensional net with mesh in the shape of a prism without bases, with one pair of its parallel walls comprising mixing elements in form of a beam in contact with the upper membrane supported on a mixing element in form of a beam in contact with the lower membrane and positioned at an angle of 60-120° to the beam in contact with the upper membrane.

Known from literature (J. Schwinge et al./Journal of Membrane Science 229 (2004) 53-61,) is a solution, wherein the mixing element comprises a beam or a connector positioned at an angle of 45-90° to the flow direction. Depending on a solution, the mixing element may comprise a beam in contact with the membrane, connector positioned in the middle of a channel, or beams and connectors arranged alternately.

Known from an American patent application US2018071688 is a design of a spacer, wherein mixing elements comprise drop-shaped beams connected with adjacent beams by means of connectors shaped like an arc.

Known from an American patent description US20180117533 is a solution comprising the use of a spacer in form of a three-dimensional net, wherein beams and connectors form a three-dimensional sponge-shaped structure (the so-called Schwartz surfaces), enhancing fluid mixing. The mixing elements comprise various triply periodic minimal structures. The spacer comprises two parallel beams in contact with the upper and lower membrane connected with a connector in contact with the beams at half height and forming an angle of 90° with the beam axis. A connector so positioned prevents fluid flow and forces it to flow around the top and the bottom of the partition, thus enhancing the mixing, the beams and connectors are hollow.

Published description US20160151745 discloses a design of a spacer, wherein the mixing element is a structure made of four beams forming diagonals of a cuboid.

In the existing solutions, the partition obstructing fluid flow forces the fluid to flow around in one or two ways (e.g. above and/or below the beam acting as a partition obstructing the flow).

SUMMARY OF THE INVENTION

The purpose of the invention is to develop a spacer for membrane modules provided with mixing elements characterized by low flow resistance of the medium and high efficiency in creating turbulence in the medium by forcing it to flow around the partition in a number of ways.

The spacer with mixing elements according to the invention comprises and a three-dimensional net with polygon-shaped mesh with the number of sides n equal or greater than 5, having at least one pair of sides made of support beams of the height H in the range of 0.1 to 10 mm and the length of 0.1 to 50 mm, parallel to one another, preferably inclined from the axis defining the flow direction by an angle α not greater than 90°, each of the said beams fitting in a cylinder volume and being in contact with the surface of membranes, at least one pair of vertices of the sides made of support beams is connected with one another by two connectors comprising mixing elements which are not in contact with the surface of both membranes at the same time, and which form an angle β smaller than 180°, each of the connectors fits in the volume of the solid formed by twisting the cylinder along its longitudinal axis by 90°, the ratio z of height h of the connectors to the height H of the support beams:

$$z = \frac{n}{H}$$

falls within the range of 1:1000 to 1:1.2, the spacer having mixing elements fixed in the meshes of the net on at least part of its surface.

In a preferred embodiment, each of the mixing elements comprises two beams of the height of 0.1-10 mm, preferably 0.3 mm, being support points of the membrane, which are in contact with the membrane and are the side edges of a polyhedron being a mesh of the net, connected by at least two connectors with the length ratio of one connector to the other ranging from 1:5 to 5:1, preferably 1:1, intersecting at an angle γ ranging from 0-180°, preferably 30°, or interweaving at least in one point of the plane projection on the plane defined by the axes of beams.

Preferably, the spacer is provided with mixing elements, wherein beams have the shape of a solid, belonging to a group consisting of an ellipsoid, sphere, polyhedron, torus, or segments of these solids.

It is also preferred if the spacer has mixing elements wherein the connectors are not in contact with the membrane.

Preferred mixing efficiency is demonstrated by the spacer according to the invention, wherein connectors of the mixing element are made of multi-filament yarn or a monofilament.

In a preferred embodiment, the spacer according to the invention comprises a three-dimensional net with hexagon-shaped mesh.

Particularly favorable functional properties are demonstrated by a spacer which comprises a warp knitted fabric with hexagon-shaped meshes, wherein each of the openwork bars (mesh) formed by weave meshes fits in the volume of the cylinder with a base whose shape is substantially similar to a circle or an ellipse, and each of the connectors fits into the volume of a solid formed by twisting a cylinder with a base similar to an ellipse along its longitudinal axis by 90°.

It is also preferred if the support beams in the spacer according to the invention have the shape of a solid selected from a group comprising an ellipsoid, sphere, polyhedron, torus, or a segment of each of these solids.

The spacer according to the invention made of monofilament or yarn of the thickness g ranging from of 0.01 to 1 mm demonstrates particular efficiency.

The spacer according to the invention may be made of plastics in form of synthetic filaments, polymer block or molding belonging to a group comprising olefin plastics, halogenated olefin plastics, polyamides, polyesters, polyurethanes, methacrylate resins and polyaryl polymers.

The spacer according to the invention may be preferably made of cotton filaments.

Preferably, the spacer is provided with mixing elements, whose beams have the shape of a solid belonging to a group comprising an ellipsoid, sphere, polyhedron, torus, or segments of these solids.

It is also preferred if the spacer has mixing elements, wherein connectors of the mixing element are not in contact with the membrane.

Preferred mixing efficiency is demonstrated by the spacer according to the invention, wherein connectors of the mixing element are made of multi-filament yarn or a monofilament.

It is preferred if a mixing element is made of plastics or a synthetic filament from a group comprising olefin plastics, halogenated olefin plastics, polyamides, polyesters, polyurethanes and polyaryl polymers.

Preferably, the mixing element is made of cotton filaments.

To strengthen and ensure desirable functional properties, in particular resistance to deformation under the influence of existing forces, the spacer according to the invention is preferably finished by impregnation, preferably by using a polymer or monomer solution with viscosity below 80 mPas.

Also, in order to modify surface properties, the spacer according to the invention is preferably thickened on both sides by bringing it into contact and wetting its surface elements with the surface of a viscous, binding or hardening polymer, monomer or polymer resin solution. Such a solution may be a polymer containing ionic groups such as ionen or polyelectrolyte, soluble in volatile organic solvents, allowing for homogeneous and durable coating and binding to the surface of the spacer.

In a particular embodiment, the spacer according to the invention is made of metal wire.

The design of the spacer according to the invention facilitates good mixing of the fluid without significantly increasing the flow resistance.

The spacer with mixing elements according to the invention having the form of an openwork warp knitted fabric demonstrates high mechanical resistance and its openwork design makes it possible to minimize fluid flow resistance and operate at high linear flow velocity under constant conditions. Connectors formed from meshes created by weaving filaments show high strength and at the same time create low flow resistance, firmly tying parallel sides of the net being beams (openwork bars). Thanks to the use of beams with a circular or ellipsoidal cross-section, which ensure a small contact area of the beam with membrane surface and a better use of its surface, the spacer according to the invention guarantees better module efficiency and performance. Whereas the use of connectors of a streamlined three-dimensional design and a shape similar to a propeller, obtained by means of a twist along the longitudinal axis, results in a flow that guarantees the desired mixing of the medium, beneficial in separation processes and also in heat exchange processes.

The spacer according to the invention facilitates better mixing of the fluid without significantly increasing the flow resistance. The design of the spacer mixing element is a compromise between obtaining good mixing, which is achieved by disturbing the flow of the fluid by means of a partitioning, and obtaining a small pressure drop which can be achieved by a small decrease of the fluid flow.

Special design of the mixing elements of the spacer of the design according to the invention means that the flow partitioning forces the fluid to flow around the mixing element in at least four ways which results in a better mixing of the fluid.

The design of the spacer according to the invention, showing a favorable fill factor of the inter-membrane space and a favorable number of beam contact points with membranes, guarantees maintenance of good flow conditions and a reduction of the consumption of energy necessary to maintain them. The spacer according to the invention has a mechanically robust construction regardless of the direction of stress.

The spacer with mixing elements according to the invention is used in particular in membrane pressure techniques, dialysis, diffusion dialysis, Donnan dialysis, electrodialysis, reversible electrodialysis, pervaporation and gas separation. The spacer according to the invention can be used in filtration and membrane separation processes, including water desalting and purification, and in heat exchange processes.

BRIEF DESCRIPTION OF THE DRAWINGS

The subject of the invention is presented in embodiments in the attached drawing in which.

DETAILED DESCRIPTION OF THE INVENTION

Figure 1:
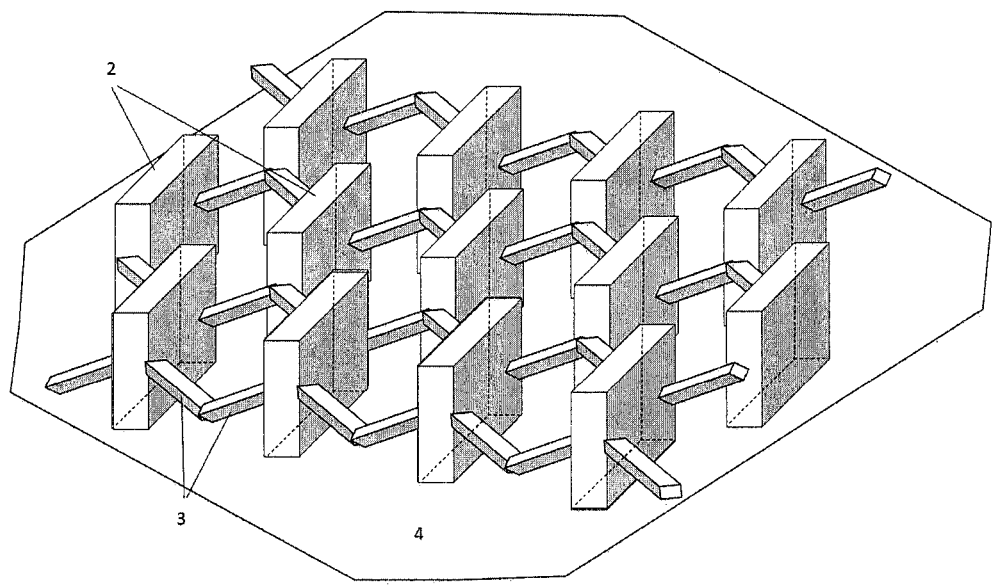
FIG. 1 schematically shows a design of a fragment of a segment of the spacer, perspective view.
Figure 2:
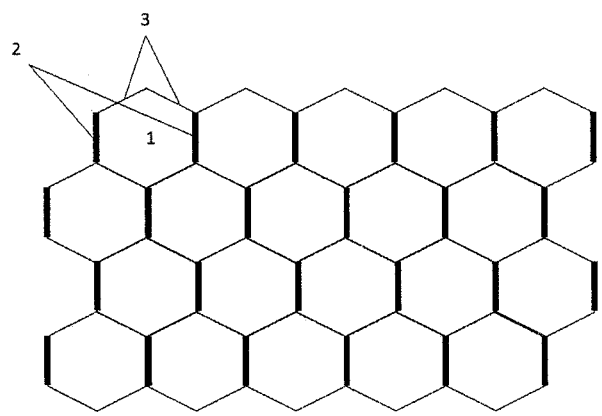
FIG. 2 shows an embodiment of a spacer with hexagon-shaped mesh, top view.
Figure 3:
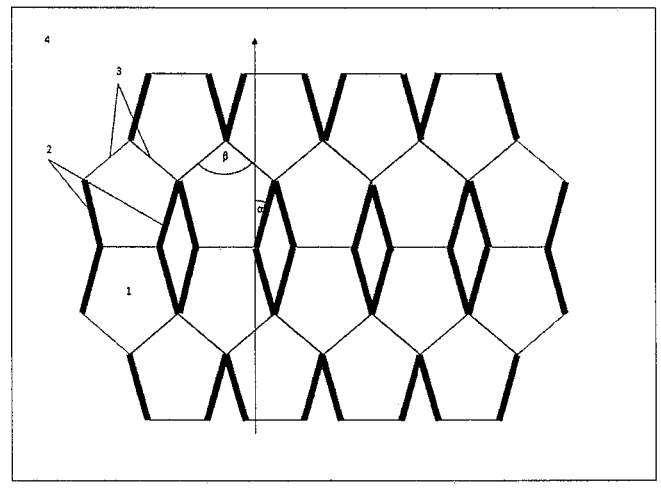
FIG. 3 shows a spacer with pentagon-shaped cross-section of the mesh, top view.
Figure 4:
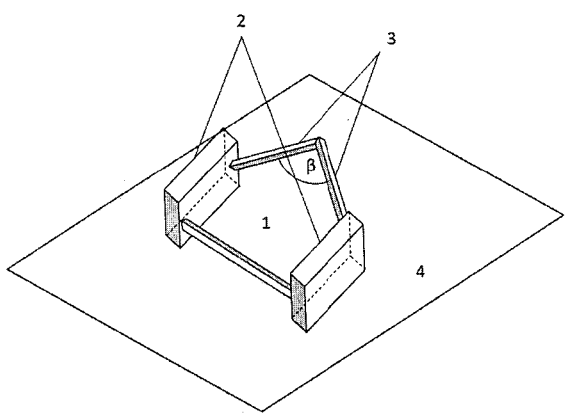
FIG. 4 shows a perspective view of diagram of a pentagon-shaped single mesh.
Figure 5:
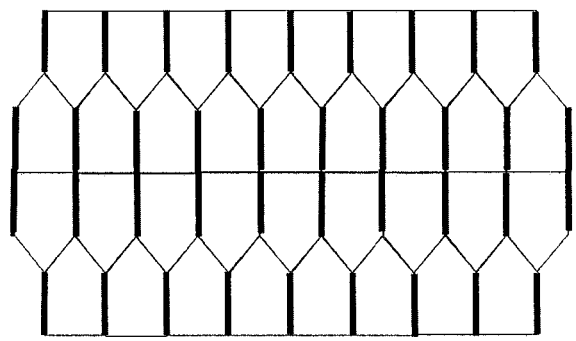
FIG. 5 shows the spacer according to the invention with pentagon-shaped mesh with two parallel walls.
Figure 6:
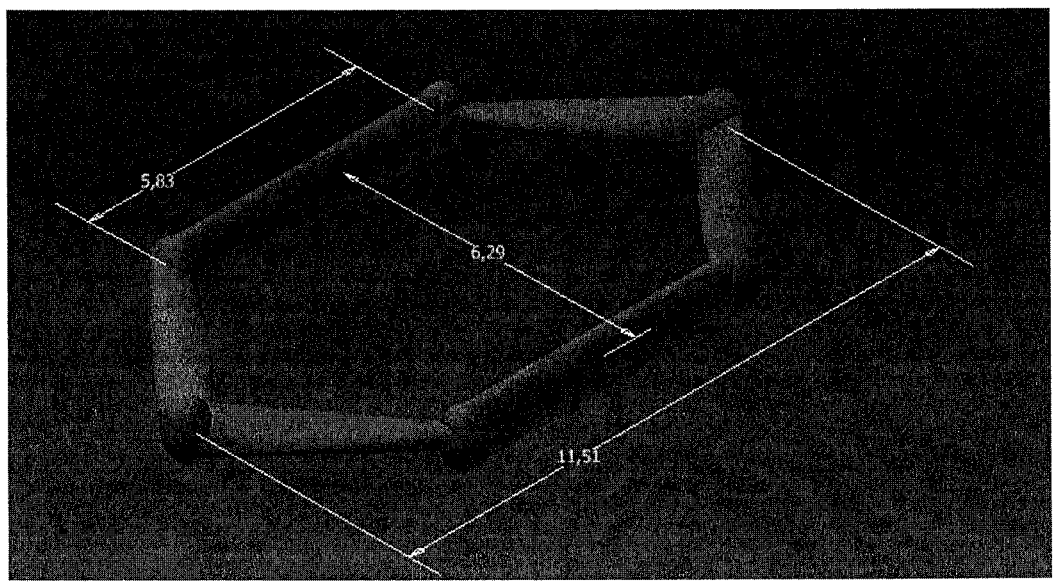
FIG. 6 shows a macroscopic view of a single hexagon-shaped mesh of a spacer with two support beams and two pairs of connectors connected at the tips of the support beams.

The spacer according to the invention is a three-dimensional net with meshes 1 in the shape of hexagons (n=6), with at least one pair of sides made of support beams 2 that are not in contact with one another, of the height H=0.4 mm and length L=3.0 mm, parallel to one another, inclined from the axis defining flow direction by an angle $\alpha=10°$, each of which fits in the cylinder volume and is in contact with membrane surface 4. At least one pair of vertices of the sides made of support beams 2 is connected to one another through two sides made of connectors 3 being mixing elements. Connectors 3 are not in contact with the surface of both membranes 4 and form between them an angle $\beta=120°$. Each connector 3 fits in the volume of a solid formed by twisting the cylinder along its longitudinal axis by 90°, and the ratio z of the height h of connectors 3 to the height H of support beams 2 is 1:5. The spacer is made of polypropylene.

In another embodiment, the spacer according to the invention comprises a three-dimensional net with mesh in the shape of pentagons n=5.

In another particularly preferred embodiment, the spacer comprises a warp knitted fabric with hexagon-shaped openwork, wherein each of the openwork bars formed by weave mesh and being the beams of the spacer 2, fits in the volume of a cylinder with a base substantially shaped like an ellipse, and each of the connectors 3 fits in the volume of a solid formed by twisting a cylinder with its base similar to an ellipse along its longitudinal axis by 90°.

The spacer has mixing elements fixed in the net mesh arranged on a part of its surface, every mixing element of the spacer according to the invention is made of beams 101 in contact with the lower and the upper membrane 103, being the side edges of a polyhedron being the mesh of the net of the spacer, connected with at least two connectors 102a and 102b, which connect with beams 101 in any point of the beams 101 and intersect or interweave at an angle $\gamma$ inside a figure defined by axes of beams 101 and the surface of membranes 103. Such a design means that the fluid flowing through the net is forced to flow around the mixing element in four different ways (under, over, from the left or the right side of the point where the connectors intersect of interweave). At the same time, the flow of the fluid is partitioned only to a small extent and as a result the pressure drop is not drastically increased.

In another embodiment of the spacer according to the invention, the mixing element is made of beams 101 in the shape of an ellipsoid and connectors 102a, 102b with connector to connector length ratio 102a:102b=1.0:1.0, connectors 102a and 102b are in contact with the beams 101 at the tips and the membranes 103 and intersect at an angle γ=45°, In another embodiment of the spacer according to the invention, the mixing element is made of beams 101 shaped like a prism with a rectangular basis and connectors 102a, 102b, with the connector to connector length ratio 102a:102b 1.3:1.0, which intersect at an angle γ=35° and are in contact with beams 101, but are not in contact with membranes 103.

In another embodiment of the spacer according to the invention, the mixing element is made of beams 101 shaped like a prism with a rectangular base and one connector 102a and two connectors 102b with connector to connector length ratio 102a:102b=1.3:1.0, connector 102a and two connectors 102b are not in contact with the beams 101 at the tips or membranes 103 and intersect at an angle γ=35°.

In another embodiment of the design of the spacer according to the invention, the spacer comprises a net, wherein the mixing element is positioned in the mesh. The mesh of the three-dimensional net with a mixing element was obtained from a prismatoid 104 by removing the bases and replacing two side walls with a shape of the mixing element of the spacer according to the invention thus obtaining a solid 105. The mixing element of the spacer according to the invention comprises at least one wall of a polyhedron without bases which defines the mesh of a three-dimensional net constituting the design of the spacer. The polyhedron may be a prism or an antiprism or a pyramid or a truncated pyramid or a prism or a wedge.

In another embodiment of the design of the spacer according to the invention, the mixing elements are positioned in the mesh of a three-dimensional net which constitutes the spacer. In the embodiment, nine meshes of the net were connected, with each mesh with mixing elements obtained from a tetrahedron by removing the bases and two opposing side walls and replacing one of them with a shape of the mixing element thus obtaining a three-dimensional net.

In another embodiment of the spacer according to the invention, the mixing element was positioned in the spacer made in form of a three-dimensional net as openwork warp knitted fabric made of 20-filament polyamide yarn, wherein the bars of the openwork are beams 101, whereas two threads of the yarn connecting bars of the openwork are connectors 102a, 102b. In this embodiment, the knitted fabric is the spacer in form of a three-dimensional net comprising a mixing element with the height of beams 101 of 0.26 mm, the connector to connector length ratio 102a:102b=10:7 and an angle between connectors γ=20°.

The spacer is made of a polyamide monofilament or, alternatively, yarn of a thickness of 0.15 mm.

In another embodiment, the spacer is made of polyester multi-filament yarn of the thickness of 0.05 mm.

In other embodiments of the spacer according to the invention, support beams 2 may have the shape of an ellipsoid or a sphere, polyhedron or torus or comprise segments of each of these solids.

Also, depending on the embodiment, the spacer according to the invention may be made of plastics in the form of synthetic filaments, polymer block or molding included in a group comprising olefin plastics, halogenated olefin plastics, polyamides, polyesters, polyurethanes and methacrylate resins and polyaryl polymers.

In another special embodiment, the spacer with mixing elements is made of cotton filaments.

In another special embodiment, the spacer according to the invention is finished by impregnation in the solution of a hardening polymer resin.

In another embodiment, the spacer according to the invention has both sides of its surface thickened by bringing it into contact and wetting its surface elements with a polymer or hardening monomer solution containing ionic groups, permanently binding with the spacer surface.

In a particular embodiment, the spacer according to the invention is made of metal wire.

Comparative Test

Figure 8:
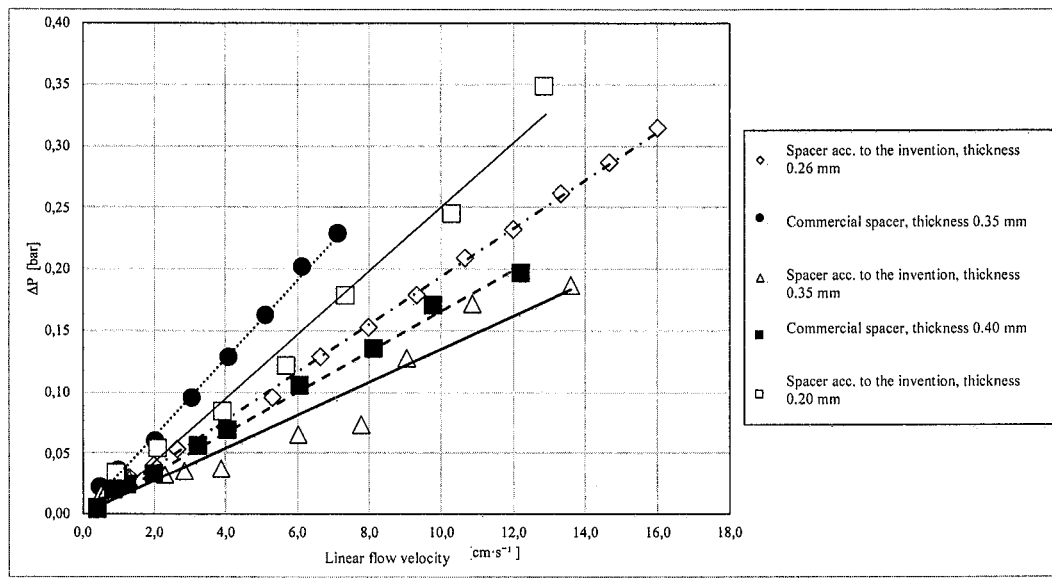
FIG. 8 shows the relation of pressure drop to the linear flow velocity for various spacers.

The purpose of the test was to compare the relation between pressure drop and the linear flow velocity of a fluid in an electrodialyser of the length of 70 cm (FIG. 8). The tests were based on the use of commercial spacers of the thickness of 0.35 mm and 0.4 mm, and spacers according to the invention of the thickness of 0.2 mm, 0.26 mm and 0.35 mm. The tests showed that the spacer according to the invention is characterized by flow resistance that is approximately 20% lower as compared to results observed for commercial spacers of a similar thickness.

Figure 9:
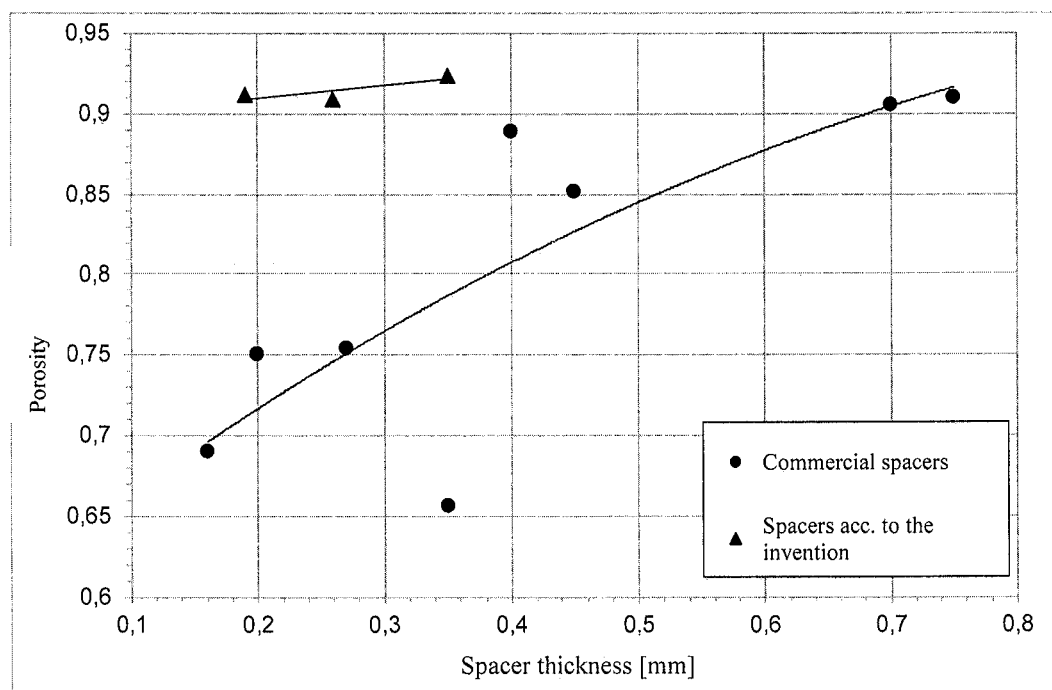
FIG. 9 shows the relation of porosity to the thickness and design of spacers.

Porosity (FIG. 9) of commercial spacers of the thickness of 0.16 mm, 0.2 mm, 0.26 mm, 0.35 mm, 0.4 mm, 0.45 mm, 0.7 mm and 0.75 mm was compared with the spacer according to the invention of the thickness of 0.2 mm, 0.26 mm and 0.35 mm. The tests showed that the spacer according to the invention is characterized by higher porosity as compared to results observed for commercial spacers of a similar thickness.

Figure 10:
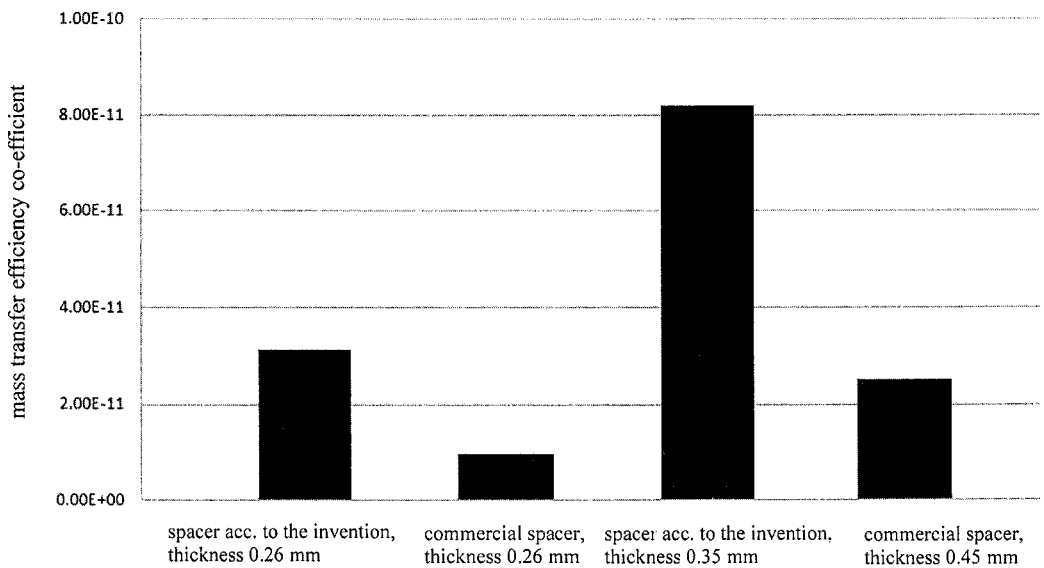
FIG. 10 shows the value of mass transfer efficiency coefficients in a pressure membrane module for various spacers.

Tests were performed in a pressure membrane module with the use of commercial spacers of the thickness of 0.26 mm, 0.45 mm and the spacer according to the invention of the thickness of 0.26 mm and 0.35 mm, linear flow velocity 0.075 m/s. Mass transfer efficiency co-efficient was calculated based on the obtained results (FIG. 10). The coefficient is a product of mass transport co-efficient and pressure drop per unit of length. The highest mass transfer efficiency co-efficient was observed for a spacer of the thickness of 0.35 mm made by knitting technology, which was a result of a relatively good mass transfer co-efficient and particularly low flow resistance.

Figure 11:
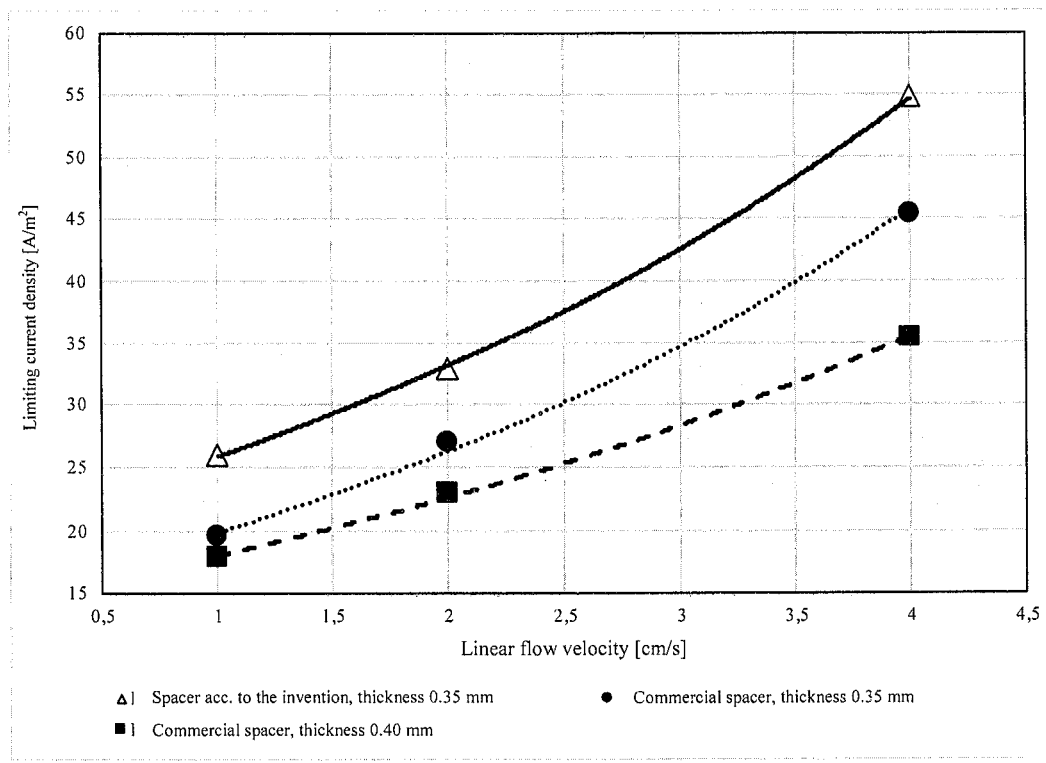
FIG. 11 shows the relation of the limiting current density to the linear flow velocity for various spacers.
Figure 12:
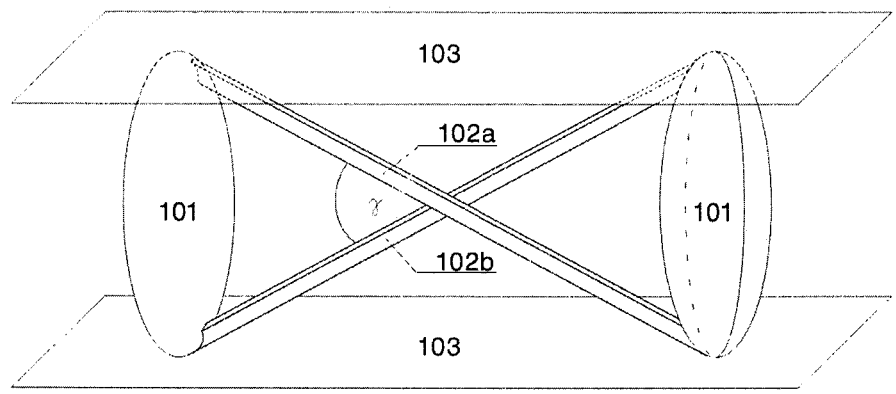
FIG. 12 shows a mixing element of the spacer comprising ellipsoidal beams and connectors.
Figure 13:
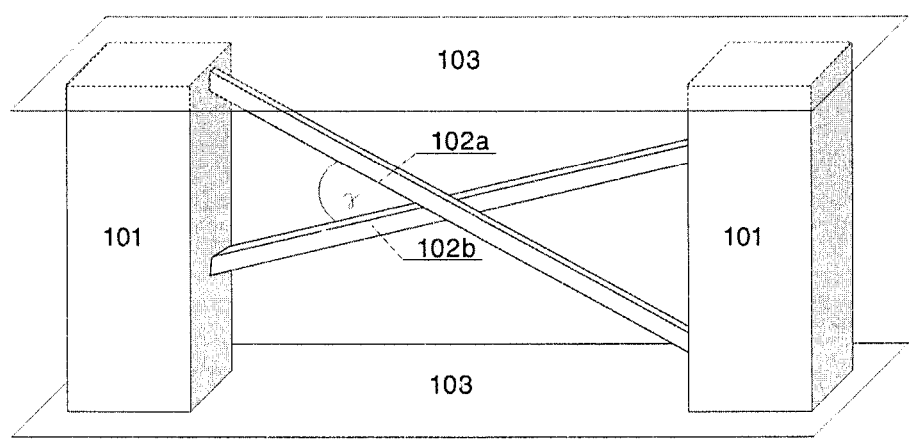
FIG. 13 shows a mixing element of the spacer, wherein the connectors are not in contact with membranes.
Figure 14:
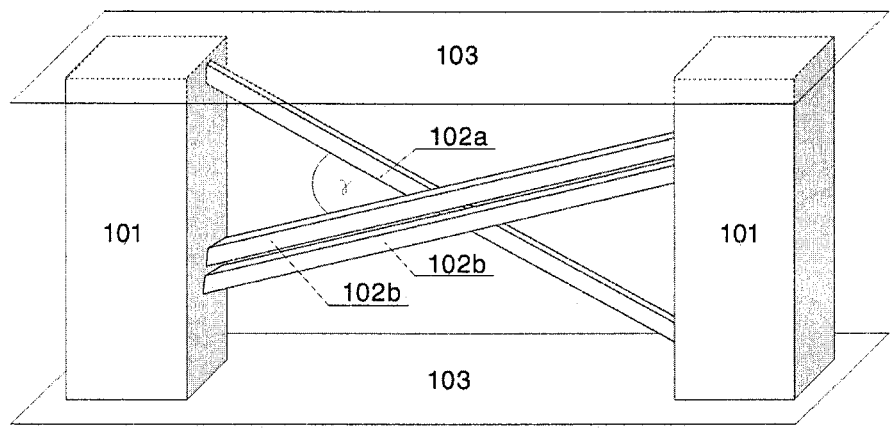
FIG. 14 shows a mixing element of the spacer comprising beams in the shape of a prism with a rectangular base, and three connectors that do not come into contact with beams at the tips or membranes.
Figure 15:
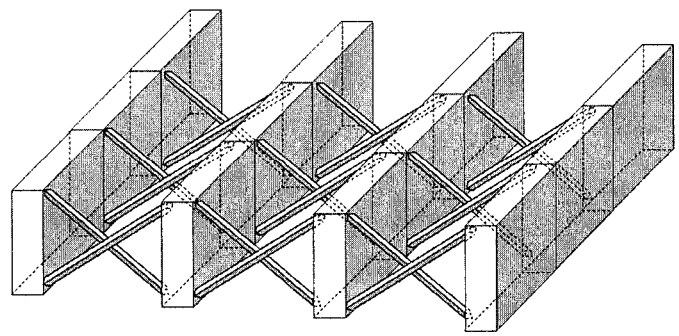
FIG. 15 shows a mixing element of the spacer positioned in the mesh of a three-dimensional net.
Figure 16:
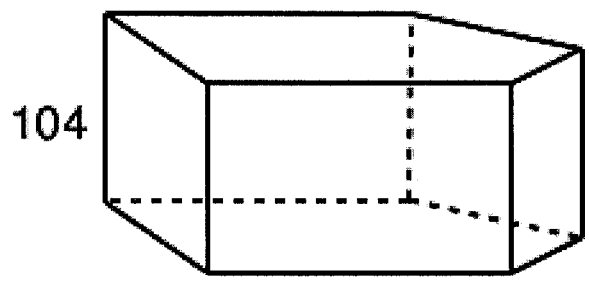
FIG. 16 shows a mixing element of the spacer positioned in the mesh of a three-dimensional net constituting the spacer; the mesh of the three-dimensional net with a mixing element was obtained from a prismatoid (104) by removing the bases and replacing two side walls with the shape of a mixing element according to the invention, thus obtaining a solid (105)
Figure 16:
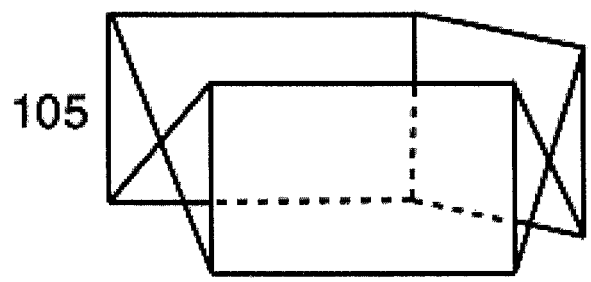
Figure 17:
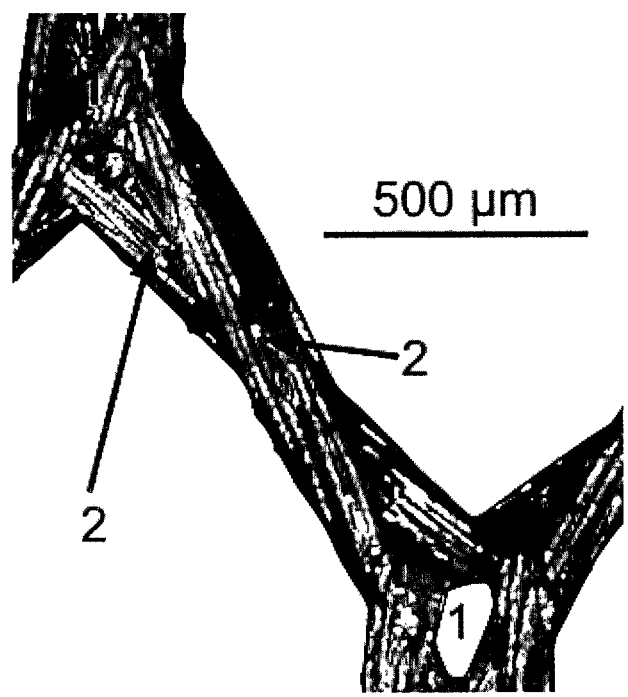
FIG. 17 shows a mixing element of the spacer used in the spacer made in the form of a three-dimensional net as an openwork warp knitted fabric.
Figure 18:
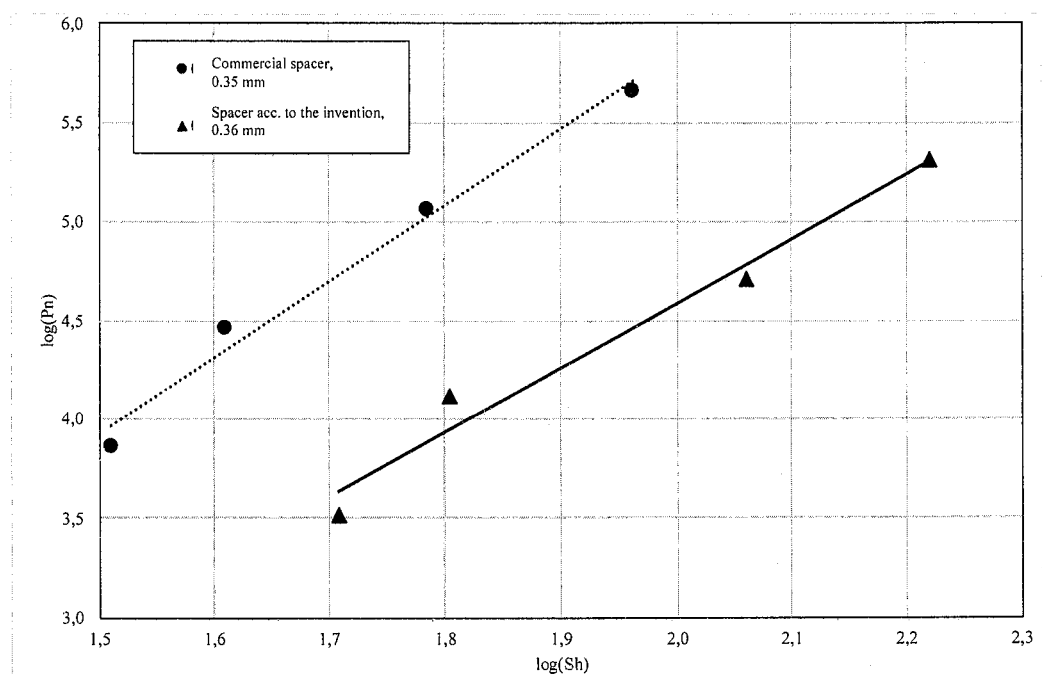
FIG. 18 shows a graph illustrating results of a comparative experiment.

Tests were performed in an electrodialysis module with the use of commercial spacers of the thickness of 0.35 mm, 0.4 mm and the spacer according to the invention of the thickness of 0.35 mm. Limiting current density was determined for linear flow velocity of 1, 2 and 4 cm/s and diluate salinity of 0.4 g/dm$^3$ (FIG. 11). Tests showed that the limiting current density value in a module with spacers according to the invention is higher than is the case for a module equipped with commercial spacers of a similar thickness.

Comparative Experiment

Figure 7:
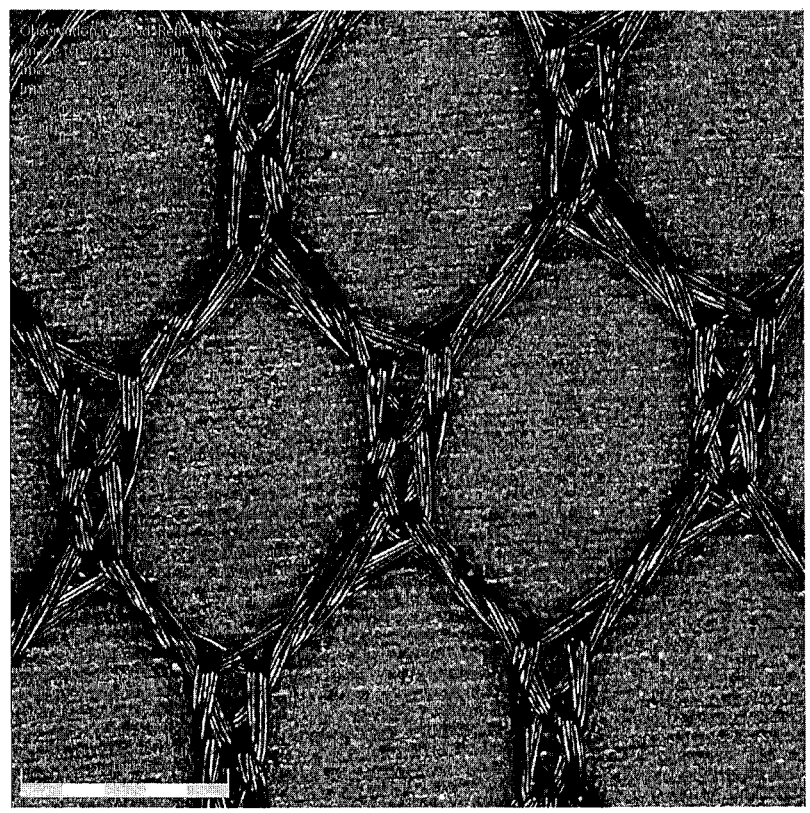
FIG. 7 shows a fragment of the surface of the spacer in the form of an openwork warp yarn knitted fabric with mesh in form of hexagons; enlarged perspective view

A commercial spacer of the thickness of 0.35 mm, wherein the mixing element comprises beams 101 which are in contact with the membrane and are positioned at an angle α=90° to the flow direction was compared with a spacer of the thickness of 0.36 mm, wherein the height of beams 101 was 0.36 mm, and the length ratio of connector 102a to connector 102b was 1.0:1.0, and the angle between connectors γ was 11°. Tests were conducted in an elctrodialyser equipped with four pairs of membranes PC-SK/PC-SA, with efficient membrane surface of 4.5 cm². The obtained results are presented in a graph (FIG. 7) which shows the relation between Sherwood dimensionless number [Sh], which describes the mass transfer coefficient, and a dimensionless power number [Pn], which describes consumption of energy for pumping the fluid.

Results obtained during the comparative experiment show clearly that the use of a mixing element according to the invention made it possible to increase the mass transfer co-efficient by approximately 40% while maintaining energy consumption at the same level.

The invention claimed is:

1. A spacer suitable for a membrane module the spacer comprising:
    a three-dimensional net with mesh (1) having a shape of polygons with a number of sides n≥5
    at least one pair of the number of sides is made of support beams (2, 101) that are in contact with two membranes of the membrane module placed on both sides of the spacer and are not in contact with one another;
    wherein the support beams (2, 101) have a height (H) equal to the distance between the membranes and in the range of 0.1 to 10 mm, and a length L in the range of 0.1 to 10 mm;
    wherein the support beams (2, 101) are parallel to each other;
    wherein each of the support beams (2, 101) fits in a volume of a cylinder and is in contact with a surface of the two membranes (4, 103) of the membrane module;
    at least one pair of the vertices of the at least one pair of sides made of the support beams (2, 101) is connected with one another by two connectors (3, 102a, 102b);
    wherein the two connectors (3, 102a, 102b) are mixing elements that are not in contact with the surface of the two membranes (4, 103) of the membrane module and form between them an angle β<180°;
    wherein the two connectors (3, 102a, 102b) fit in a volume of a solid formed by twisting a cylinder along its longitudinal axis by 90°;
    wherein a relation (z) of a height (h) of the two connectors (3, 102a, 102b) to the height (H) of the support beams (2, 101) is in a range from 1:1000 to 1:1.2;
    wherein the cylinder is defined by the height (h) and the length L; and
    wherein the two connectors (3, 102a, 102b) are arranged at least on a part of surface of the spacer and fixed in the three-dimensional net with mesh.

2. The spacer according to claim 1, wherein the support beams (2, 101) constitute side edges of the shape of a polygon of the three-dimensional net with mesh (1);
    wherein each of the two connectors (102a, 102b) have a length and ratio of the respective lengths of the two connectors (102a, 102b) has a range of 1:5 to 5:1;
    wherein the two connectors (102a, 102b) intersect at an angle (γ) in the range of 0-180°; and
    wherein the two connectors (102a, 102b) are in contact with each other at least one point.

3. The spacer according to claim 1, wherein the support beams (2, 101) have a shape of a solid belonging to a group comprising an ellipsoid, sphere, polyhedron, torus, or a segment of one of these solids.

4. The spacer according to claim 1, wherein the two connectors (3, 102a, 102b) are not in contact with at least one of the two membranes (103).

5. The spacer according to claim 1, wherein the two connectors (3, 102a and 102b) are made of multi-filament yarn or a monofilament.

6. The spacer according to claim 1, wherein n=6.

7. The spacer according to claim 1, wherein the three-dimensional net with mesh (1) is a wrap knitted fabric with n=6 and forming an openwork;
    wherein the support beams (2, 101) are knit meshes forming openwork bars and that fit in the volume of a cylinder with the shape of the base similar to a circle or an ellipse; and
    wherein each of the two connectors (3, 102a, 102b) fits in the volume of a solid formed by twisting a cylinder along it longitudinal axis by 90°.

8. The spacer according to claim 1, wherein the support beams (2, 101) have a shape of a solid selected from a group comprising an ellipsoid, sphere, polyhedron, torus, or a segment of each of these solids.

9. The spacer according to claim 1, comprising a monofilament or yarn of the thickness of 0.01 to 1 mm.

10. The spacer according to claim 1, comprising plastics in form of synthetic filaments, polymer block or molding belonging to a group comprising olefin plastics, halogenated olefin plastics, polyamides, polyesters, polyurethanes and methacrylate resins and polyaryl polymers.

11. The spacer according to claim 1, comprising cotton filaments.

12. The spacer according to claim 1, wherein the spacer is finished by impregnation.

13. The spacer according to claim 1, wherein the spacer is finished by impregnation in a solution of hardening polymer resin.

14. The spacer according to claim 1, wherein a surface on both sides of the spacer is thickened by bringing it into contact and wetting its surface elements with a surface of a viscous binding solution.

15. The spacer according to claim 1, wherein both sides of the surface of the spacer are thickened by bringing it into contact and wetting its surface elements with a polymer or hardening monomer solution containing ionic groups, permanently binding with the spacer surface.

16. The spacer according to claim 1, wherein the spacer is made of a metal wire.

* * * * *